United States Patent [19]
Mehoudar

[11] Patent Number: 5,294,212
[45] Date of Patent: Mar. 15, 1994

[54] IRRIGATION SYSTEMS

[75] Inventor: Raphael Mehoudar, Tel-Aviv, Israel

[73] Assignee: Hydroplan Engineering Ltd., Tel Aviv, Israel

[21] Appl. No.: 865,100

[22] Filed: Apr. 8, 1992

[51] Int. Cl.⁵ ............................................. E02B 11/00
[52] U.S. Cl. ....................................... 405/36; 405/43; 239/10; 239/317
[58] Field of Search .................. 405/36, 37, 39, 43, 405/51; 137/268; 239/10, 310, 317, 727

[56] References Cited

U.S. PATENT DOCUMENTS

| | | | |
|---|---|---|---|
| 1,173,534 | 2/1916 | Ryan | 405/39 X |
| 1,604,189 | 10/1926 | Nelson | 405/39 X |
| 3,351,290 | 11/1967 | Baldwin | 239/317 X |
| 3,419,360 | 12/1968 | Rak | 239/310 X |
| 3,592,386 | 7/1971 | Tschudy | 239/10 |
| 4,133,671 | 1/1979 | Mikel . | |
| 4,221,501 | 9/1980 | Saburi | 405/37 |
| 4,250,910 | 2/1981 | King | 137/268 |
| 4,340,179 | 7/1982 | Knapp . | |
| 4,957,134 | 9/1990 | Craig | 137/268 |
| 5,005,601 | 4/1991 | Strong . | |
| 5,010,912 | 4/1991 | Riding | 137/268 |
| 5,066,468 | 11/1991 | Arnold et al. | 137/268 X |

FOREIGN PATENT DOCUMENTS

| | | | |
|---|---|---|---|
| 3313578 | 8/1979 | Australia . | |
| 76231 | 7/1947 | Czechoslovakia | 239/317 |
| 248486 | 8/1912 | Fed. Rep. of Germany . | |
| 1375881 | 9/1964 | France | 239/317 |
| 54828 | 6/1978 | Israel . | |
| 8102376 | 9/1981 | PCT Int'l Appl. . | |
| 18928 | 2/1910 | United Kingdom . | |
| 2174884 | 11/1986 | United Kingdom . | |

*Primary Examiner*—Dennis L. Taylor
*Assistant Examiner*—John Ricci
*Attorney, Agent, or Firm*—Helfgoff & Karas

[57] ABSTRACT

An installation for the controlled dosing of an irrigation flow with a herbicide particularly for detecting root growth into the outlets of an underground drip irrigation line, includes a sealed container and a slow release herbicide material wherein a portion of the flow is directed through the herbicide impregnated material so that herbicide is controllably released into the diverted flow, and the diverted flow is reintroduced into the irrigation flow.

12 Claims, 1 Drawing Sheet

IRRIGATION SYSTEMS

FIELD OF THE INVENTION

This invention relates to irrigation systems, and in particular to drip irrigation systems.

BACKGROUND OF THE INVENTION

Drip irrigation systems have now been known and used for many years on an increasingly large scale. Whilst some of the original proposals for the use of drip irrigation involved the laying of the irrigation pipes in the ground, this subterranean form of drip irrigation has not been generally adopted and most drip irrigation systems involve locating the drip irrigation conduits above ground. One of the main reasons for the hitherto relative lack of success in such subterranean drip irrigation systems is generally attributed to the fact that such systems are prone to blockage by plant roots which tend to grow in the direction of the water outlets of the system, thereby tending to block these outlets.

There have in the past been proposals to overcome this problem, for example by periodically injecting into the throughflowing irrigation flow a suitable herbicide. Whilst such herbicides can, in appropriate doses, selectively inhibit root growth, and thereby prevent or limit blockage of the water outlets by roots, the growth of the plant as a whole is not deleteriously affected. If, however, for one reason or another the maximum dose of the herbicide is exceeded then, quite clearly, the plant as a whole may be damaged or destroyed. The difficulties inherent in ensuring that the dosage of the throughflowing irrigation flow does not exceed a prescribed level have limited the adoption of this proposal.

It has furthermore been proposed (U.K. Patent Serial No. 2174884) to tackle this problem by providing for the use of drip emitter units which are formed of a plastics material which is wholly or in part impregnated with a herbicide material which is capable of being released into the irrigation water over a considerable period of time. This proposal is, however, subject to several major drawbacks. Thus, it is known that the release of such herbicides is very much dependent on environmental conditions in general, and on surrounding temperature in particular. For example, a rise in ambient temperature of 10° C. can very much increase the rate of release of herbicide from the plastic material in which the herbicide is impregnated and this could lead to an undesirably high concentration of the herbicide in the soil with consequent damage to the plants.

Furthermore, seeing that the release of the herbicide from the plastic material takes place continuously and, as indicated above, this release is significantly accelerated by any rise in temperature, it will be apparent that such release will also take place during storage and transport. In consequence, and prior to the laying of the drip irrigation system in the ground, the emitters and/or any other components of the system which consist of or include such herbicide impregnated components, must be suitably packaged and enclosed if it is to be ensured that by the time the system is rendered operational, the herbicide content of the system will not have fallen below required levels. This requirement for suitable packaging and enclosing which can, of course, involve the packaging and enclosing of many hundreds of meters of irrigation piping, can be clearly complicated and costly.

Furthermore, it will be realized that the size of the emitter unit clearly determines the initial concentration of the herbicide in the unit and, in consequence, the amount of herbicide in a relatively small unit will be significantly less than that in a relatively large unit. It will therefore be necessary to determine the concentration of the herbicide in the plastics material, bearing in mind the size and surface area of the unit to be manufactured, and this clearly complicates the manufacture of such units.

Finally, with a drip irrigation system employing such emitter units, once the concentration of the herbicide in the system falls below a predetermined minimum there is no alternative but to replace the system as a whole, and this clearly is time-consuming and expensive.

The problems referred to above and, to a limited degree, the suggested solutions thereof, whilst relating particularly to drip irrigation, also arise from time to time in connection with other forms of irrigation, to which the present invention is also directed.

It is an object of the present invention to provide a new and improved irrigation system wherein the disadvantages involved in the hitherto-proposed solutions are substantially reduced or overcome. It is also an object of the present objection to provide a method for the controlled dosing of an irrigation flow with a herbicide, in which the disadvantages referred to above are substantially reduced.

BRIEF SUMMARY OF THE INVENTION

According to the present invention there is provided a method for the controlled dosing of an irrigation flow with a herbicide, comprising the steps of diverting a portion of said flow through a herbicide impregnated material so that herbicide is controllably released into the diverted flow, and reintroducing the diverted flow into said irrigation flow.

Preferably the method is aimed at deterring root growth into the outlets of an underground drip irrigation line.

In accordance with a further aspect of the present invention, there is provided an irrigation system comprising an irrigation conduit; a bypass having a bypass inlet flow-coupled to an upstream portion of the conduit and a bypass outlet flow-coupled to a downstream portion of the conduit; and a herbicide impregnated material located in said bypass and designed to release herbicide into the throughflowing liquid; the arrangement being such that a portion of the irrigation flow passes through said bypass and re-enters the conduit downstream of said bypass dosed with said herbicide.

Preferably the system is an underground drip irrigation system, there being provided an installation designed to deter root growth into the outlets of the system.

Preferably, the herbicide impregnated material is located in a sealed container having a flow inlet designed to be flow-coupled to an upstream portion of the bypass and a flow outlet designed to be flow-coupled to a downstream portion of the bypass, with a flowpath in the container between the flow inlet and the flow outlet extending through at least the major dimension of the container.

The bypass is furthermore provided with means for regulating the flow therethrough, and in this way the dosing of the main irrigation flow with the herbicide can be controlled and varied.

With an irrigation system in accordance with the invention, the herbicide-impregnated material can at all times, and prior to its incorporation in the system, be kept under optimum conditions as far as the release of herbicide therefrom is concerned and/or can be readily protected against such release. Furthermore, once incorporated in the system the material which is located in the sealed container, which in turn is at least partially embedded in the ground, is thermally insulated and is thereby protected against excessive release of the herbicide owing to undesirable temperature rises.

Furthermore, by suitably regulating or even interrupting the flow through the bypass, the dosing level of the main irrigation flow can be varied as required or, if desired, can be reduced to zero.

BRIEF SUMMARY OF THE DRAWINGS

For a better understanding of the present invention, and to show how the same may be carried out in practice, reference will now be made to the accompanying drawings, in which.

DETAILED DESCRIPTION OF PREFERRED EMBODIMENT

Figure 2:
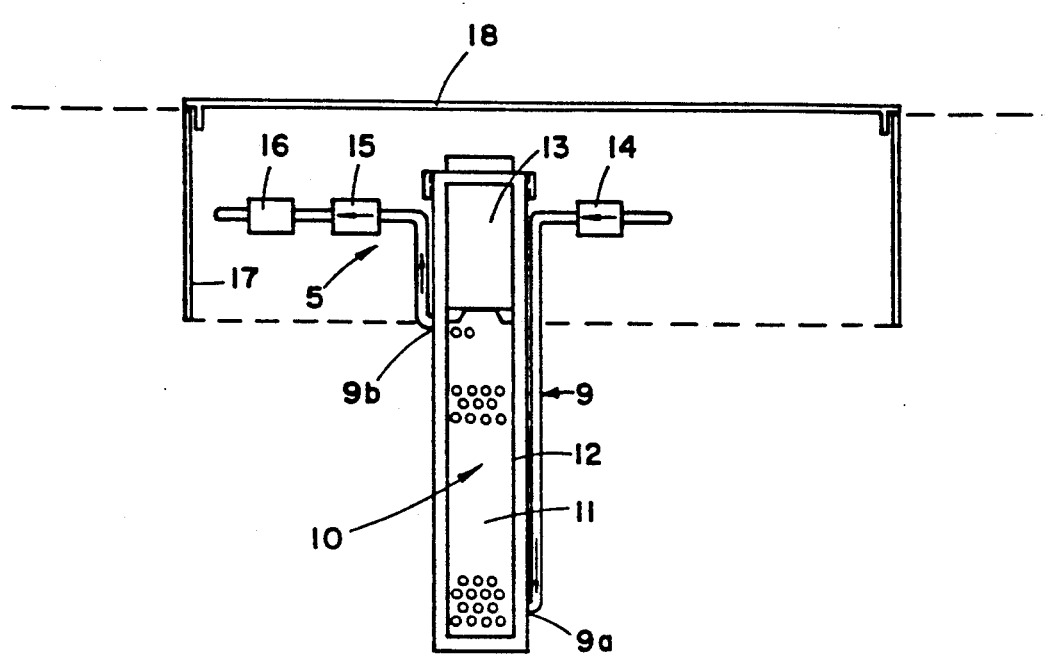
FIG. 2 is a side elevation of the same system.
Figure 1:
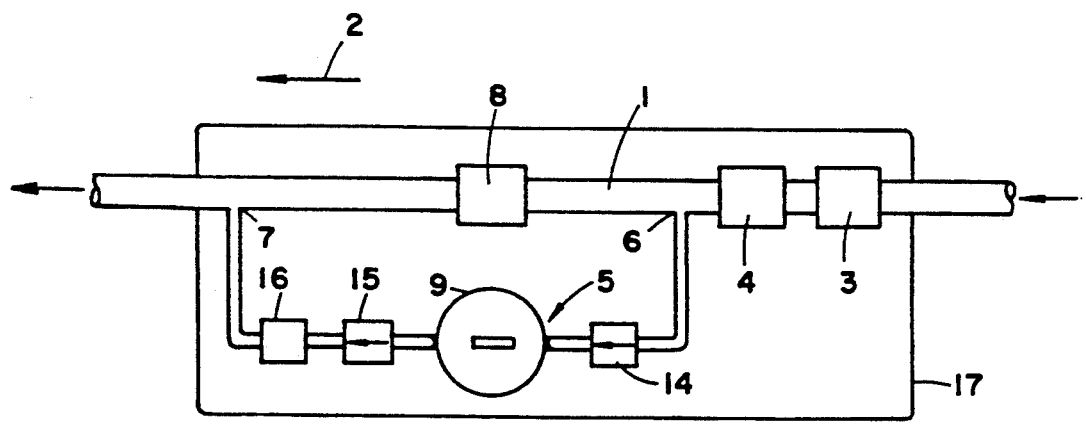
FIG. 1 is a schematic plan view of a portion of an irrigation system in accordance with the present invention.

As seen in the drawings, a drip irrigation system in accordance with the invention comprises an irrigation supply line portion 1 through which there is an irrigation flow in the direction of an arrow 2. The irrigation supply line portion 1 is designed to be coupled to a water supply source (not shown), whilst the irrigation line itself is in a region downstream to portion shown, is provided with drip emitters (not shown) and is designed to be buried in the ground. The irrigation supply line portion 1 is provided with a main flow valve 3 and an anti-siphoning device 4. A bypass 5 is flow-coupled at an inlet 6 thereof to an upstream region of the irrigation line portion 1 and at an outlet 7 thereof to a downstream region of the irrigation supply line portion 1. A flow resistance valve 8 is incorporated in the irrigation supply line portion 1 intermediate the regions thereof where it is flow-coupled to the bypass 5. A sealed container 9 having an inlet 9a thereof located in a lowermost portion of the container and an outlet 9b thereof located in an uppermost portion of the container is flow-coupled to the bypass 5. Located within the container is an exchangeable cartridge 10 comprising or containing a herbicide impregnated material 11 enclosed within a permeable envelope 12. The container 9 is provided at its upper end with a thermally insulating closure plug 13. Located within the bypass 5 upstream of the inlet 9a is an upstream check valve 14, whilst located within the bypass 5 downstream of the outlet 9b is a downstream check valve 15 followed by a herbicide control valve 16.

The bypass 5, like the irrigation supply line portion 1 to which it is coupled, is, as shown in FIG. 2 of the drawings, located below ground level, whilst the portion of the container 9 enclosing the cartridge 10 is located within the ground. The bypass 5 and the associated irrigation supply line portion 1 are surrounded by a protective casing 17 having a removable lid 18.

With the herbicide control valve 16 closed, all the irrigation flow passes through the irrigation supply line portion 1 and no dosing of the irrigation flow with herbicide occurs. Once the herbicide control valve 16 is opened and the flow resistance valve 8 in the main irrigation line is adjusted so as to ensure that a portion of the irrigation flow passes through the bypass 5, this portion will flow via the upstream check valve 14 into the inlet 9a in the container 9 and through the herbicide impregnated material 11. During this throughflow, herbicide is released into the water, which emerges from the outlet 9b of the container 9, passes through the downstream check valve 15 and, via the herbicide control valve 16, into the main irrigation supply line portion 1, thereby effecting dosing of the irrigation flow through the main irrigation supply line portion 1.

It will be readily seen that by controlling the valve 16, the flow of the water through the bypass 5 into the main irrigation supply line portion I can be controlled, and in this way there can be carefully controlled the degree of dosing of the main irrigation flow through the irrigation supply line portion 1. The provision of the anti-syphoning device 4 is designed to ensure that under no circumstances is there a back flow of dosed water into the main irrigation supply line portion 1.

In the embodiment described above the provision of the bypass 5 with two check valves 14, 15, respectively upstream and downstream of the container 9 ensures that the container 9 is maintained in a relatively sealed condition when no water flows therethrough. It will be appreciated, however, that this requirement can be achieved where only one check valve 14 is provided upstream of the container 9 with the control valve 16 located downstream of the container 9.

The provision of the herbicide impregnated material 11 in a sealed container 9 ensures that herbicide is not uncontrollably released into the ground when water flows therethrough, but all the dosed water has to pass through the herbicide control valve 16.

Whilst in the embodiment described above the herbicide control valve 16 is located downstream of the container 9, it will be appreciated that control of the degree of dosing can also be effected by having this control valve 16 upstream of the container 9, seeing that also in that situation the amount of water flowing through the container 9 is controlled.

The herbicide impregnated material 11 can be in the form of herbicide impregnated granules located in a suitable permeable envelope 12, or in any other suitable form having a large surface area exposed to the water. The cartridge may be constituted by a molded, permeable block of herbicide impregnated material which, in order to increase its exposed surface area, can be porous.

A suitable herbicide for use in accordance with the present invention can be constituted by the herbicide known by the trade name TREFLAN, for example those known as 2,6,dinitroanilines.

The material which is to be impregnated in a known manner by the herbicide can be constituted by synthetic polymers or rubbers. As an example, the concentration of the herbicide in the material impregnated thereby can lie between 5% to 25%, preferably 15%.

Where the material 11 is in the form of granules it is located within a perforated or net-like envelope 12 of any suitable material such as, for example, synthetic polymers or metal. Where the material is in the form of a moulded block it can, of course, be located directly in the container 9.

The container 9 can suitably be formed of a durable rust-resistant material such as, for example, stainless steel.

With such a system 1,000 cc of the known herbicide at a 15% concentration for use in a drip irrigation system having an overall discharge rate of 10 cubic meters per hour is effective for an extended period of time.

With a system as described and in accordance with the present invention, the dosing of the main irrigation flow with the herbicide can be at all times controlled. Furthermore, in view of the fact that the herbicide impregnated material is located within or can be constituted by discrete cartridges, these cartridges, after manufacture and assembly, can readily and easily be stored under conditions designed to prevent excessive release of herbicide prior to the installation in the irrigation system. Furthermore, once installed in the irrigation system, the fact that the cartridge is located in the earth ensures that it is effectively insulated against variations in ambient temperature which could give rise to differing rise of rates of release of the herbicide.

Once the level of release of herbicide from the cartridge falls below the desired level, the cartridge can readily and rapidly be replaced without in any way interfering with the irrigation system as a whole.

Where the irrigation supply line portion incorporates a filter, the herbicide impregnated material can be located within the filter casing. Alternatively, the filtering elements of a filter can be formed of herbicide impregnated material and in this way it is ensured that the filter fulfills a double function of filtering the through flowing water and at the same time dosing it with herbicide.

Whilst, as described above, the use of the invention has been particularly described with reference to a drip irrigation system, it will be appreciated that it could equally well be employed with other forms of irrigation systems requiring protection against uncontrolled root growth.

Furthermore, whilst the invention has been described with reference to the controlled dosing of an irrigation system with a herbicide by dosing a portion of the flow through the system into a bypass which includes herbicide impregnated material, the invention also extends to the situation where, under the appropriate circumstances, the entire irrigation flow is designed to flow through the herbicide impregnated material which is coupled in-line with the main irrigation flow. In this case, too, and where continuous control of the level of dosing is not so essential, considerable advantages may be obtained as compared with previously proposed disclosures, in that the herbicide impregnated material is confined to a distinct cartridge which can be protected against the effects of undesirable temperature variations and which can readily be replaced as required.

I claim:

1. In an underground drip irrigation system including a drip irrigation line having successive spaced apart drip outlets, an installation for deterring root growth into said outlets comprising an irrigation supply conduit coupled to said drip irrigation line; a bypass having a bypass inlet flow-coupled to an upstream portion of the conduit, a bypass outlet flow-coupled to a downstream portion of the conduit upstream of said drip irrigation line; a single sealed container having a flow inlet flow-coupled to an upstream portion of the bypass, a flow outlet flow-coupled to a downstream portion of the bypass; a flowpath in the container provided between the flow inlet and the flow outlet thereof and extending through at least a major dimension of the container; and a slow release herbicide impregnated material selected for the group consisting of synthetic polymer and rubber and located within said container; said container and said bypass being arranged such that a portion of irrigation flow passes through said container and is controllably dosed with said herbicide and is reintroduced into said conduit to pass through and out of said outlet.

2. An installation according to claim 1, wherein said container is of elongated shape, and is largely inserted into the ground.

3. An installation according to claim 2, wherein said container is provided with a thermally insulating sealing plug.

4. An installation according to claim 1, and furthermore provided with a herbicide control valve flow-coupled in said bypass downstream of said container.

5. An installation according to claim 1, and furthermore provided with a herbicide control valve flow-coupled in said bypass upstream of said container.

6. An installation according to claim 1, and furthermore provided with a one-way check valve flow-coupled in said bypass upstream of said container.

7. An installation according to claim 6, and furthermore provided with an additional one-way check valve flow-coupled in said bypass downstream of said container.

8. An installation according to claim 1, wherein said herbicide is constituted by 2,6,dinitroanilines.

9. An installation according to claim 1, wherein the concentration of the herbicide in the material impregnated thereby lies substantially between 5% to 25%.

10. An installation according to claim 9, wherein said concentration is substantially equal to 15%.

11. An installation according to claim 1, wherein said container is an elongated container, and said flowpath in said container between said flow inlet and said flow outlet thereof extends along an axis of elongation of the container.

12. An installation according to claim 1, which is located below ground level and wherein said container is an elongated container with said major dimension defined vertically.

* * * * *